(12) United States Patent
Asthana et al.

(10) Patent No.: US 11,487,590 B2
(45) Date of Patent: Nov. 1, 2022

(54) ORCHESTRATION ENGINE RESOURCES AND BLUEPRINT DEFINITIONS FOR HYBRID CLOUD COMPOSITION

(71) Applicant: Kyndryl, Inc., New York, NY (US)

(72) Inventors: Neeraj Asthana, Acton, MA (US); Thomas E. Chefalas, Somers, NY (US); Alexei Karve, Mohegan Lake, NY (US); Ameya Tayade, White Plains, NY (US)

(73) Assignee: KYNDRYL, INC., New York, NY (US)

( * ) Notice: Subject to any disclaimer, the term of this patent is extended or adjusted under 35 U.S.C. 154(b) by 216 days.

(21) Appl. No.: 16/155,109

(22) Filed: Oct. 9, 2018

(65) Prior Publication Data
US 2020/0110640 A1 Apr. 9, 2020

(51) Int. Cl.
*G06F 9/455* (2018.01)
*G06F 9/50* (2006.01)
*G06N 20/00* (2019.01)

(52) U.S. Cl.
CPC ........... *G06F 9/5077* (2013.01); *G06N 20/00* (2019.01)

(58) Field of Classification Search
CPC .................................................. G06F 9/45533
USPC ............................................................ 718/1
See application file for complete search history.

(56) References Cited

U.S. PATENT DOCUMENTS

| | | | | |
|---|---|---|---|---|
| 8,448,170 B2* | 5/2013 | Wipfel | ..................... | G06F 9/455 718/1 |
| 9,015,712 B1* | 4/2015 | Hodge | ................ | G06F 9/45558 718/1 |
| 9,172,657 B2* | 10/2015 | Catrein | ................. | G06F 9/5072 |
| 9,935,825 B2* | 4/2018 | Aswathanarayana | ... | H04L 67/34 |
| 10,355,922 B1* | 7/2019 | Stienhans | ........... | H04L 41/0806 |
| 2007/0150936 A1* | 6/2007 | Maes | ....................... | H04L 67/10 726/1 |
| 2011/0126207 A1* | 5/2011 | Wipfel | .................. | H04L 9/3213 718/104 |
| 2011/0191383 A1* | 8/2011 | Addala | ................... | G06F 16/00 707/E17.012 |

(Continued)

OTHER PUBLICATIONS

Dragan, et al., "Application Blueprints and Service Description," Heterogeneity, High Performance Computing, Self-Organization and the Cloud, Chapter 4, © The Author(s) 2018, 29 pages.

(Continued)

*Primary Examiner* — Mehran Kamran
(74) *Attorney, Agent, or Firm* — Amin, Turocy & Watson, LLP

(57) ABSTRACT

Techniques that facilitate orchestration engine resources and/or blueprint definitions for hybrid cloud composition are provided. In one example, a system includes a blueprint component and a blueprint transformation component. The blueprint component determines one or more abstract resource types for an abstract blueprint associated with a computing platform. The one or more abstract resource types are indicative of information associated with one or more computing resources for the computing platform. The blueprint transformation component transforms the one or more abstract resource types for the abstract blueprint into one or more executable resources for an executable blueprint that is executable by an orchestration engine.

20 Claims, 12 Drawing Sheets

(56) References Cited

U.S. PATENT DOCUMENTS

| | | | | |
|---|---|---|---|---|
| 2011/0209140 | A1* | 8/2011 | Scheidel | H04L 41/082 717/172 |
| 2013/0067485 | A1* | 3/2013 | Shamilian | G06F 9/45533 718/100 |
| 2013/0232480 | A1* | 9/2013 | Winterfeldt | G06F 9/5072 717/177 |
| 2013/0232498 | A1* | 9/2013 | Mangtani | G06F 9/5038 718/104 |
| 2013/0263080 | A1* | 10/2013 | Karnik | G06F 8/35 717/104 |
| 2014/0075032 | A1* | 3/2014 | Vasudevan | H04L 41/50 709/226 |
| 2014/0143879 | A1* | 5/2014 | Milman | G06F 21/577 726/25 |
| 2014/0237550 | A1* | 8/2014 | Anderson | G06F 9/45533 726/22 |
| 2014/0380308 | A1* | 12/2014 | Hassine | G06F 9/45558 718/1 |
| 2015/0106809 | A1* | 4/2015 | Reddy | G06F 9/5077 718/1 |
| 2015/0128135 | A1* | 5/2015 | Cao | G06F 9/5066 718/1 |
| 2015/0304175 | A1* | 10/2015 | Maes | H04L 41/5054 709/226 |
| 2015/0304234 | A1* | 10/2015 | Salle | H04L 47/781 709/226 |
| 2015/0378703 | A1* | 12/2015 | Govindaraju | G06F 8/60 717/174 |
| 2016/0156661 | A1* | 6/2016 | Nagaratnam | H04L 63/20 726/1 |
| 2016/0162312 | A1* | 6/2016 | Doherty | G06F 11/3051 718/1 |
| 2018/0024852 | A1* | 1/2018 | Yabushita | G06F 9/45558 718/1 |
| 2018/0336121 | A1* | 11/2018 | Alladi | G06F 11/3672 |
| 2018/0341477 | A1* | 11/2018 | Kulkarni | G06F 8/34 |
| 2019/0229983 | A1* | 7/2019 | Govindaraju | H04L 41/0806 |
| 2019/0278928 | A1* | 9/2019 | Rungta | G06F 9/5077 |
| 2020/0110640 | A1* | 4/2020 | Asthana | G06F 9/5072 |

OTHER PUBLICATIONS

Dragan, et al., "Exposing HPC Services in the Cloud: the Cloudlightning Approach," Scalable Computing: Practice and Experience, vol. 17, No. 4, © 2016 SCPE, pp. 323-330.

Oracle, "Enterprise Manager Cloud Administration Guide," 57 Introduction to Blueprints, Retrieved: Jul. 20, 2018, 16 pages.

Berezin, "OOM with TOSCA and Cloudify," last modified by Michael O'Brien on Jan. 3, 2018, 6 pages.

Antequera, "Custom Templates for Hybrid Cloud Resources Orchestration and User Workflows," A Thesis presented to the Faculty of the Graduate School at the University of Missouri, Dec. 2014, 63 pages.

Lipton, et al., "TOSCA Solves Big Problems in the Cloud and Beyond," Theme Article: Cloud Orchestration, Retrieved: Jul. 20, 2018, 11 pages.

Ppatchanee.wordpress.com, "Getting Start with UrbanCode Deploy with Patterns: A full-stack Application designer for Clouds," Mar. 7, 2016, 19 pages.

Docs.vmware.com, "VMware vRealize Automation," Retrieved: Jul. 20, 2018, 3 pages.

Mell, et al., "The NIST Definition of Cloud Computing," NIST Special Publication 800-145, Sep. 2011, 7 pages.

* cited by examiner

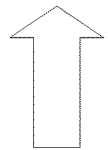
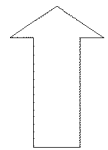
FIG. 4

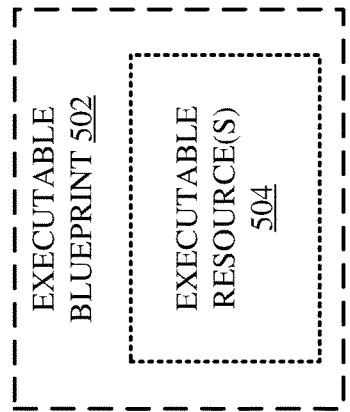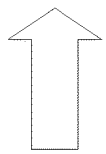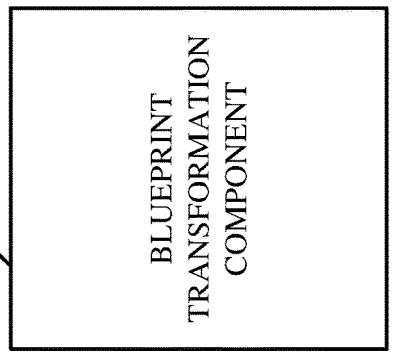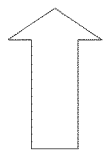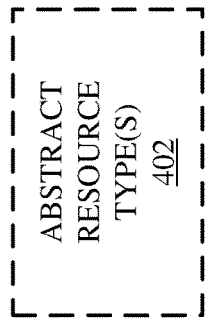
FIG. 5

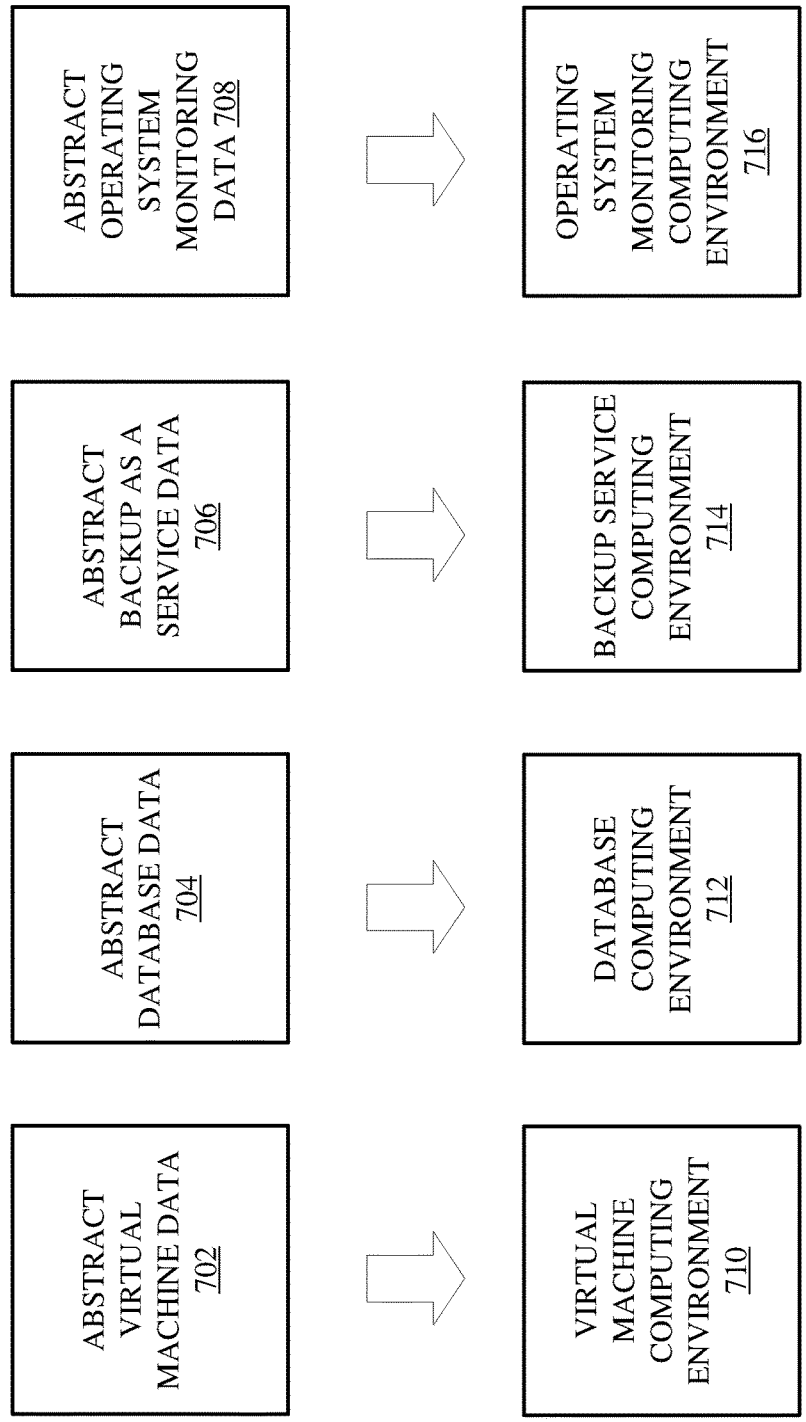

```
                                                          ┌ 806'
                                      ┌──────────────────┴──────────┐
                                      : resource "softlayer:virtual_machine" :─── 812
                                      :                             :
                                      :   name = "my_server_1"      :
                                      :   cpu = 2                   :
                                      :   ram = 4096                :
                                      :   ssh_keys = [ "123456" ]   :┐
                                      :   image = "DEBIAN_7_64"     : ├── 814
                                      :   region = "ams01"          : │
                                      :   public_network_speed = 10 :┘
                                      └─────────────────────────────┘
                                      ┌──────────────────────────────┐ ─── 808'
                                      : resource "DB2:database"      :─── 816
                                      :   name = "my_database_1"     :
                                      :   target = "my_server_1"     :
                                      └──────────────────────────────┘
                                      ┌──────────────────────────────┐
                                      : resource "Analytics:Monitoring" :
                                      :   name = "my_monitoring_1"   :
                                      :   target = "my_server_1"     :─── 810
                                      └──────────────────────────────┘
                           800 ─┐
                                              ↑
                                              │ 808
800 ─┐
   ┌────────────────────────────────────────────────┐
   │  ┌─────────────────────────────────┐ ─── 806
   │  : abstract resource "virtual_machine" :
   │  :                                 :
   │  :   name = "my_server_1"          :
   │  :   cpu = 2                       :
   │  :   memory = 4096                 :
   │  :   ssh_keys = [ "123456" ]       :
   │  └─────────────────────────────────┘
   │  ┌─────────────────────────────────┐
   │  : abstract resource "database"    :
   │  :   name = "my_database_1"        :
   │  :   target = "my_server_1"        :
   │  └─────────────────────────────────┘
   │  ┌─────────────────────────────────┐
   │  : resource "Analytics:Monitoring" :
   │  :   name = "my_monitoring_1"      :
   │  :   target = "my_server_1"        :─── 810
   │  └─────────────────────────────────┘
   └────────────────────────────────────────────────┘
       802
```

FIG. 8

ORCHESTRATION ENGINE RESOURCES AND BLUEPRINT DEFINITIONS FOR HYBRID CLOUD COMPOSITION

BACKGROUND

The subject disclosure relates to cloud computing systems, and more specifically, to computing resources for cloud computing systems.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate orchestration engine resources and/or blueprint definitions for hybrid cloud composition are described.

According to an embodiment, a system can comprise a blueprint component and a blueprint transformation component. The blueprint component can determine one or more abstract resource types for an abstract blueprint associated with a computing platform. The one or more abstract resource types can be indicative of information associated with one or more computing resources for the computing platform. The blueprint transformation component can transform the one or more abstract resource types for the abstract blueprint into one or more executable resources for an executable blueprint that is executable by an orchestration engine.

According to another embodiment, a computer-implemented method is provided. The computer-implemented method can comprise determining, by a system operatively coupled to a processor, one or more abstract resource types for an abstract blueprint associated with information for one or more computing resources of a computing platform. The computer-implemented method can also comprise transforming, by the system, the one or more abstract resource types for the abstract blueprint into one or more executable resources for an executable blueprint. Furthermore, the computer-implemented method can comprise executing, by the system, the executable blueprint on an orchestration engine associated with the computing platform.

According to yet another embodiment, a computer program product for facilitating an orchestration engine process can comprise a computer readable storage medium having program instructions embodied therewith. The program instructions can be executable by a processor and cause the processor to determine, by the processor, one or more abstract resource types for an abstract blueprint associated with information for one or more computing resources of a computing platform. The program instructions can also cause the processor to transform, by the processor, the one or more abstract resource types for the abstract blueprint into one or more executable resources for an executable blueprint. Furthermore, the program instructions can cause the processor to execute, by the processor, the executable blueprint on the computing platform.

DESCRIPTION OF THE DRAWINGS

FIG. 4 illustrates an example, non-limiting system that includes a blueprint component, an abstract blueprint and a one or more abstract resource types in accordance with one or more embodiments described herein.

FIG. 5 illustrates an example, non-limiting system that includes a blueprint transformation component, one or more abstract resource types, and an executable blueprint in accordance with one or more embodiments described herein.

FIG. 7 illustrates an example, non-limiting system that includes examples of abstract resources and real resources in accordance with one or more embodiments described herein.

FIG. 8 illustrates an example, non-limiting system that includes an abstract blueprint and an executable blueprint in accordance with one or more embodiments described herein.

DETAILED DESCRIPTION

Figure 1:
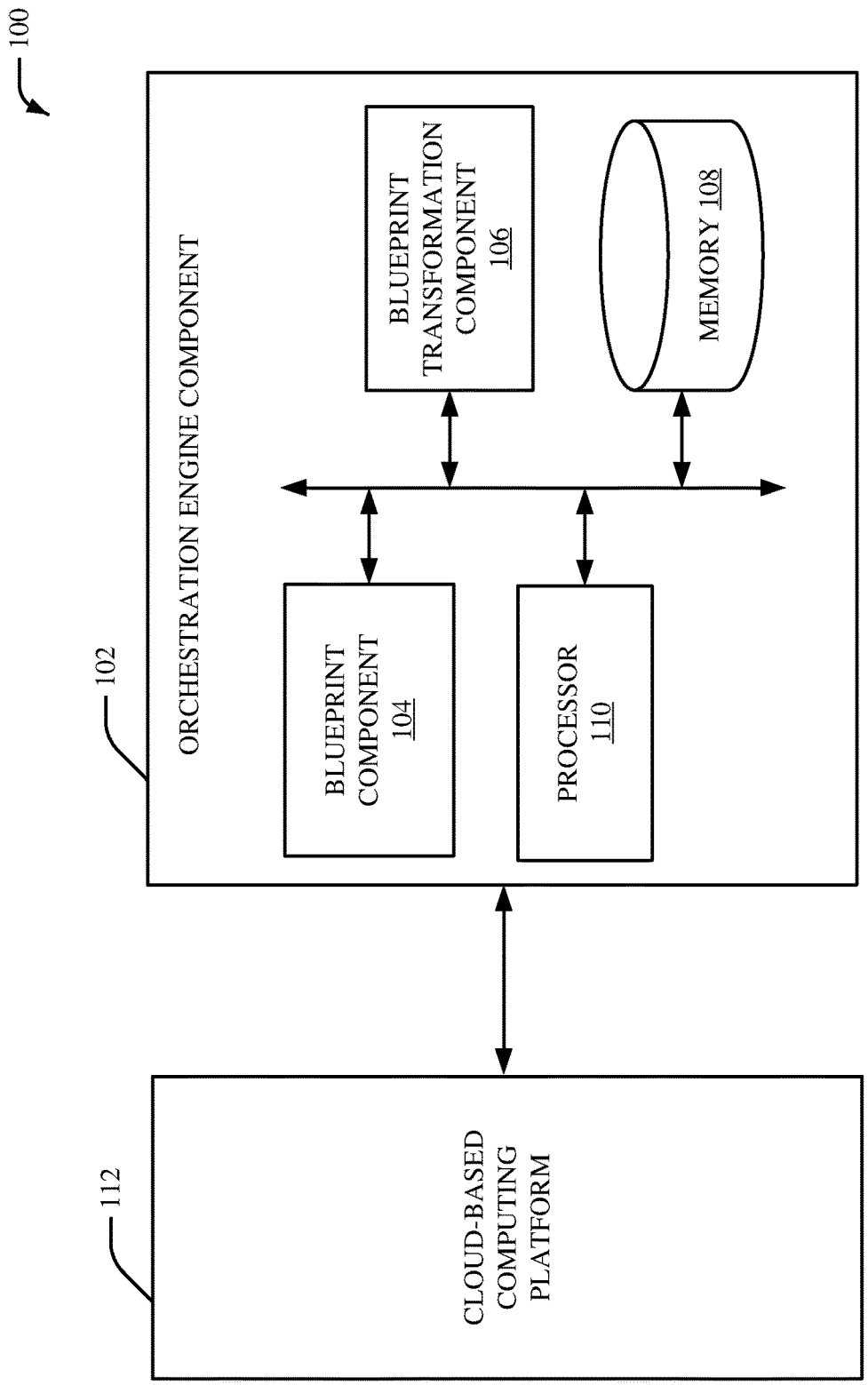
FIG. 1 illustrates a block diagram of an example, non-limiting system that includes an orchestration engine component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

An orchestration engine can manage computing resources and/or workflows in a cloud computing environment. For instance, an orchestration engine can create, modify, configure and/or delete computing resources such as, for example, infrastructure computing resources, virtual machine computing resources, hardware computing resources, software application computing resources, etc. However, with an orchestration engine employed today, it is generally difficult to translate requirements for a cloud computing environment into hardware properties and/or software properties for the cloud computing environment. For example, with an orchestration engine employed today (e.g., since properties of a cloud computing environment may vary from one deployment to another), it is generally difficult to determine operating system requirements, memory requirements, processing requirements and/or other requirements for a cloud computing environment. Moreover, manually making choices amongst numerous blueprints in a catalog is difficult and/or time consuming. Therefore, an improved orchestration engine is needed.

Embodiments described herein include systems, computer-implemented methods, and computer program products that facilitate orchestration engine resources and/or blueprint definitions for hybrid cloud composition. For example, one or more abstract orchestration engine resources and/or blueprint definitions for an orchestration engine can be employed for a hybrid cloud orchestration engine. As used herein, a "blueprint" and an "orchestration engine blueprint" are defined as a template or a pattern that declares one or more computing resources for a cloud computing environment (e.g., a cloud-based computing platform). Furthermore, as used herein, an "abstract blueprint" is defined as a template or a pattern that declares one or more abstract computing resources for a cloud computing environment (e.g., a cloud-based computing platform). Furthermore, as used herein, an "executable blueprint" is defined as a template or a pattern that declares one or more executable computing resources for a cloud computing environment (e.g., a cloud-based computing platform). A blueprint for an orchestration engine can also be a declarative representation of a workload that is formatted in a machine-readable format and a human-readable format. Furthermore, a blueprint for an orchestration engine describes a type of computing resource and/or properties for a computing resource that will be created for a cloud computing environment. In an embodiment, a system can include a cloud-based computing platform and an orchestration engine. The orchestration engine can manipulate and/or compose one or more computing resources for a cloud computing environment. The one or more computing resources can be computing resources for a virtual machine, storage, middleware, other hardware and/or other software associated with a cloud computing environment. Furthermore, one or more abstract resource types can be defined for generically describing one or more computing resources that comprise similar functions, properties, and/or actions. One or more abstract blueprints can also be generated to specify (e.g., declare) abstract computing resources and/or a composition of solutions to achieve a goal associated with the cloud-based computing platform. Based on the one or more abstract resource types and the one or more abstract blueprints, the one or more abstract resources within the one or more abstract blueprints can be transformed into one or more executable computing resources (e.g., one or more real computing resources) for one or more executable blueprints. The one or more executable blueprints can specify (e.g., declare) the one or more executable computing resources (e.g., the one or more real computing resources) and/or a composition of solutions to achieve a goal associated with the cloud-based computing platform.

In an embodiment, one or more abstract resource types (e.g., abstract resource groupings) can be defined. Furthermore, one or more real resource types that extend from an abstract resource type can be defined. The real resource types can, for example, define a transformation that maps an abstract resource to a real resource (e.g. maps or derives properties from the abstract resource to insert the abstract resource into the real resource). An abstract blueprint can also be generated. The abstract blueprint can be composed of abstract resource types and/or real resource types. A mapping of abstract resource types to real resource types that selects an extended resource from an abstract grouping can also be generated by leveraging transformation criteria (e.g. security, compliance, cost, geography, etc.). In certain embodiments, an abstract blueprint service can leverage the mapping to bind the abstract resources to real resources during interpretation and/or execution of the abstract blueprint to produce a real blueprint (e.g., an executable blueprint). Additionally, the real blueprint can be executed by an orchestration engine (e.g., an orchestration engine of a cloud-based environment). In certain embodiments, a real blueprint can be customized for one or more deployments of a cloud-based computing platform. Accordingly, one or more executable computing resource requirements for a cloud-based environment (e.g., a cloud-based computing platform) can be translated into hardware properties and/or software properties for the cloud-based environment (e.g., the cloud-based computing platform). For instance, operating system requirements, memory requirements, processing requirements and/or other requirements for a cloud-based environment (e.g., a cloud-based computing platform) can be efficiently determined. Furthermore, efficiency and/or performance of a cloud-based environment (e.g., a cloud-based computing platform) can be improved. For instance, efficiency and/or performance of hardware and/or software included in a cloud-based environment (e.g., a cloud-based computing platform) can be improved. Moreover, a number of choices in a blueprint catalog can be minimized to reduce difficulty of selection of a blueprint from a blueprint catalog.

FIG. 1 illustrates a block diagram of an example, non-limiting system 100 that facilitates orchestration engine resources and/or blueprint definitions for hybrid cloud composition in accordance with one or more embodiments described herein. In various embodiments, the system 100 can be an orchestration engine system associated with technologies such as, but not limited to, cloud computing technologies, computer technologies, server technologies, information technologies, machine learning technologies, artificial intelligence technologies, digital technologies, data analysis technologies, and/or other computer technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with an orchestration engine component, etc.) for carrying out defined tasks related to machine learning. The system 100 and/or components of the system can be employed to solve new problems that arise through advancements in technologies mentioned above, employment of cloud-computing systems, and/or computer architecture, and the like. One or more embodiments of the system 100 can provide technical improvements to cloud computing systems, computer systems, server systems, information technology systems, machine learning systems, artificial intelligence systems, digital systems, data analysis systems, and/or other systems. One or more embodiments of the system 100 can also provide technical improvements to a processing unit (e.g., a processor) associated with an orchestration engine process by improving processing performance of the processing unit, improving processing efficiency of the processing unit, and/or reducing an amount of time for the processing unit to perform a patch management process. One or more embodiments of the system 100 can also provide technical improvements to a cloud computing environment (e.g., a cloud-based computing platform) by improving processing performance of the cloud computing environment and/or improving processing efficiency of the cloud computing environment. In one example, the system 100 can be associated with an orchestration engine process.

In the embodiment shown in FIG. 1, the system 100 can include an orchestration engine component 102. As shown in FIG. 1, the orchestration engine component 102 can include a blueprint component 104 and a blueprint transformation component 106. Aspects of the orchestration engine component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the orchestration engine component 102 can also include memory 108 that stores computer executable components and instructions. Furthermore, the orchestration engine component 102 can include a processor 110 to facilitate execution of the instructions (e.g., computer executable components and corresponding instructions) by the orchestration engine component 102. As shown, the blueprint component 104, the blueprint transformation component 106, the memory 108 and/or the processor 110 can be electrically and/or communicatively coupled to one another in one or more embodiments. In certain embodiments, the orchestration engine component 102 can be in communication with a cloud-based computing platform 112. The cloud-based computing platform 112 can be a cloud computing environment. In one example, the cloud-based computing platform 112 can be a hybrid cloud-based computing platform. In another example, the cloud-based computing platform 112 can be a public cloud-based computing platform. In yet another example, the cloud-based computing platform 112 can be a private cloud-based computing platform.

The blueprint component 104 can determine one or more abstract resource types for the cloud-based computing platform 112. The one or more abstract resource types can be indicative of information associated with one or more computing resources for the cloud-based computing platform 112. The one or more computing resources for the cloud-based computing platform 112 can include one or more computing resources for hardware associated with the cloud-based computing platform 112 and/or one or more computing resources for software associated with the cloud-based computing platform 112. In a non-limiting example, the one or more computing resources can include one or more computing resources for a processor associated with the cloud-based computing platform 112, one or more computing resources for a virtual machine associated with the cloud-based computing platform 112, one or more computing resources for storage associated with the cloud-based computing platform 112, one or more computing resources for middleware associated with the cloud-based computing platform 112, and/or one or more other computing resources associated with the cloud-based computing platform 112.

In an embodiment, the one or more abstract resource types can generically describe one or more computing resources that comprise similar functions, properties, and/or actions. For instance, the one or more abstract resource types can include virtual machine data (e.g., abstract virtual machine data), database data (e.g., abstract database data), backup as a service data (e.g., abstract backup as a service data), operating system monitoring data (e.g., abstract operating system monitoring data) and/or other data (e.g., other abstract data). In an aspect, the one or more abstract resource types can include information associated with a virtual machine of the cloud-based computing platform 112 such as, but not limited to, central processing unit data associated with the virtual machine, memory data associated with the virtual machine, operating system data associated with the virtual machine, network address data (e.g., internet protocol (IP) address data) associated with the virtual machine, geography data associated with the virtual machine, security policy data associated with the virtual machine, and/or other data associated with the virtual machine. Additionally or alternatively, the one or more abstract resource types can include information associated with a database of the cloud-based computing platform 112 such as, but not limited to, table name data associated with the database, memory data associated with the database, user data associated with the database (e.g., db_root_username, db_root_password, etc.), port data associated with the database, and/or other data associated with the database. Additionally or alternatively, the one or more abstract resource types can include information associated with a backup service (e.g., a backup as a service process) of the cloud-based computing platform 112 such as, but not limited to, policy data associated with the backup service, schedule data associated with the backup service, permissions data associated with the backup service, security data (e.g., api_key, etc.) associated with the backup service, endpoint network address data (e.g., endpoint IPs, etc.) associated with the backup service, and/or other data associated with the backup service. Additionally or alternatively, the one or more abstract resource types can include information associated with operating system monitoring for the cloud-based computing platform 112 such as, but not limited to, policy data associated with the operating system monitoring, schedule data associated with the operating system monitoring, metrics data associated with the operating system monitoring, security data (e.g., api_key, etc.) associated with the operating system monitoring, endpoint network address data (e.g., endpoint IPs, etc.) associated with the operating system monitoring, and/or other data associated with the operating system monitoring. In one example, the information associated with the one or more computing resources can include a number of processors and/or a type of processor for the cloud-based computing platform 112. Additionally or alternatively, the information associated with the one or more computing resources can include an amount of memory and/or a type of memory for the cloud-based computing platform 112. Additionally or alternatively, the information associated with the one or more computing resources can include a network speed for the cloud-based computing platform 112. However, it is to be appreciated that the information associated with the one or more computing resources can include other type of information associated with the cloud-based computing platform 112.

In another embodiment, the blueprint component 104 can receive and/or generate an abstract blueprint associated with the cloud-based computing platform 112. The abstract blueprint associated with the cloud-based computing platform 112 can be, for example, a template or a pattern that declares the one or more abstract resource types (e.g., the one or more computing resources) for the cloud-based computing platform 112. The abstract blueprint associated with the cloud-based computing platform 112 can also generically describe a type of computing resource and/or properties for a computing resource that is created for the cloud-based computing platform 112. In an aspect, the abstract blueprint can be exported from the cloud-based computing platform 112 as a readable text file. The readable text file associated with the abstract blueprint can be formatted in a machine-readable format and a human-readable format. For example, the abstract blueprint can be a machine-readable representation and a human-readable representation of the one or more abstract resource types. In one example, the readable text file associated with the abstract blueprint can be formatted in a machine-readable format and a human-readable format associated with a data serialization language. In another example, the readable text file associated with the abstract blueprint can be formatted in a machine-readable format and a human-readable format associated with a data array language. In yet another example, the readable text file associated with the abstract blueprint can be formatted in a machine-readable format and a human-readable format associated with automated documentation. As such, the abstract blueprint associated with the cloud-based computing platform 112 can be a declarative representation of the one or more abstract resource types for the cloud-based computing platform 112 that is formatted in a machine-readable format and a human-readable format. In an aspect, the blueprint component 104 can interpret content of the abstract blueprint to determine the one or more abstract resource types for the cloud-based computing platform 112. For example, the blueprint component 104 can interpret machine-readable content and/or human-readable content to determine the one or more abstract resource types for the cloud-based computing platform 112. In an embodiment, the blueprint component 104 can determine one or more dependencies between one or more abstract resource types for the cloud-based computing platform 112 based on the content of the abstract blueprint. In certain embodiments, the blueprint component 104 can employ an aspect groupings knowledge database to identify the one or more abstract resource types in the abstract blueprint associated with the cloud-based computing platform 112. The aspect groupings knowledge database can be, for example, a collection of previously identified abstract resource types and/or information for previously identified abstract resource types. In one example, the aspect groupings knowledge database can be stored in the memory 108 or another memory.

The blueprint transformation component 106 can transform the one or more abstract resource types for the abstract blueprint into one or more executable resources for an executable blueprint. The executable blueprint can be executable by the cloud-based computing platform 112. For example, the executable blueprint can be executable by an orchestration engine associated with the cloud-based computing platform 112. In an aspect, the executable blueprint can be indicative of a machine-readable representation of the one or more executable resources. The one or more executable resources can be, for example, one or more real resources that can be executable by the cloud-based computing platform 112. For instance, the one or more executable resources can be one or more deployable resources for execution by one or more applications associated with the cloud-based computing platform 112. The one or more applications can be provided, for example, by one or more computing environments. For example, the one or more executable resources can include executable data for a virtual machine computing environment, a database computing environment, a backup service computing environment, an operating system monitoring environment, and/or another computing environment.

In an embodiment, the blueprint transformation component 106 can generate mapping data to facilitate generation of the executable blueprint. The mapping data can be indicative of a mapping of the one or more abstract resource types to the one or more executable resources. In an aspect, the blueprint transformation component 106 can generate the executable blueprint based on the mapping data. In another aspect, the blueprint transformation component 106 can generate the mapping data based on a set of transformation criteria. For example, the set of transformation criteria can be criteria related to one of service level agreement data, software data, deployment environment data, cost data, security data, location data (e.g., geography data), response time data, dependency data, deadline data, description data, benchmark data, maintainer data, user data, historical data, performance data, risk level data, estimated benefit data and/or other data associated with the cloud-based computing platform 112. The blueprint transformation component 106 can, for example, select an extended resource from an abstract grouping associated with the one or more abstract resource types by employing the set of transformation criteria. Furthermore, the blueprint transformation component 106 can employ the mapping data to bind the one or more abstract resource types to real resources (e.g., the one or more executable resources) during, for example, interpretation and/or execution of the abstract blueprint to generate the executable blueprint.

In another aspect, the blueprint transformation component 106 can map virtual machine data associated with the abstract blueprint (e.g., the one or more abstract resource types for the abstract blueprint), database data associated with the abstract blueprint (e.g., the one or more abstract resource types for the abstract blueprint), backup as a service data associated with the abstract blueprint (e.g., the one or more abstract resource types for the abstract blueprint), operating system monitoring data associated with the abstract blueprint (e.g., the one or more abstract resource types for the abstract blueprint) and/or other data associated with the abstract blueprint (e.g., the one or more abstract resource types for the abstract blueprint) into executable resources for the virtual machine computing environment, the database computing environment, the backup service computing environment, the operating system monitoring environment, and/or another computing environment. For instance, the information associated with the virtual machine of the cloud-based computing platform 112 that is included in the abstract blueprint can be mapped to a virtual machine computing environment, the information associated with the database of the cloud-based computing platform 112 that is included in the abstract blueprint can be mapped to a database computing environment, the information associated with the backup service (e.g., the backup as a service process) of the cloud-based computing platform 112 that is included in the abstract blueprint can be mapped to a backup service computing environment, and/or the information associated with the operating system monitoring for the cloud-based computing platform 112 that is included in the abstract blueprint can be mapped to an operating system computing environment. The virtual machine computing environment can be a computing environment associated with one or more virtual machines (e.g., one or more virtual servers) associated with the cloud-based computing platform 112. The database computing environment can be a computing environment associated with one or more databases associated with the cloud-based computing platform 112. The backup service computing environment can be a computing environment associated with one or more servers of the cloud-based computing platform 112 that provides one or more backup services. The operating system monitoring environment can be a computing environment associated with one or more servers of the cloud-based computing platform 112 that provides one or more operating system monitoring services.

In certain embodiments, the blueprint transformation component 106 can transmit the executable blueprint to the cloud-based computing platform 112 to facilitate employment of the executable blueprint by the cloud-based computing platform 112. For instance, the blueprint transformation component 106 can transmit the executable blueprint to an orchestration engine associated with the cloud-based computing platform 112 to facilitate employment of the one or more executable resources by the cloud-based computing platform 112. In certain embodiments, the blueprint component 104 and/or the blueprint transformation component 106 can apply the executable blueprint and/or the one or more executable resources to hardware and/or software associated with the cloud-based computing platform 112. In one embodiment, the executable blueprint and/or the one or more executable resources can be employed to determine an optimal path of execution for hardware and/or software associated with the cloud-based computing platform 112. In certain embodiments, the blueprint component 104 and/or the blueprint transformation component 106 can facilitate display of the abstract blueprint, the executable blueprint, the one or more abstract resource types, and/or the one or more executable resources. For instance, blueprint component 104 and/or the blueprint transformation component 106 can render the abstract blueprint, the executable blueprint, the one or more abstract resource types, and/or the one or more executable resources on a display device. The display device can be, for example, a computing device with a display, a computer, a desktop computer, a laptop computer, a monitor device, a smart device, a smart phone, a mobile device, a handheld device, a tablet, a wearable device, a portable computing device or another type of device associated with a display. In an aspect, the blueprint component 104 and/or the blueprint transformation component 106 can generate a user interface to display at least a portion of the abstract blueprint, the executable blueprint, the one or more abstract resource types, and/or the one or more executable resources in a human interpretable format.

It is to be appreciated that the orchestration engine component 102 (e.g., the blueprint component 104 and/or the blueprint transformation component 106) performs an orchestration engine process that cannot be performed by a human (e.g., is greater than the capability of a single human mind). For example, an amount of data processed, a speed of processing of data and/or data types processed by the orchestration engine component 102 (e.g., the blueprint component 104 and/or the blueprint transformation component 106) over a certain period of time can be greater, faster and different than an amount, speed and data type that can be processed by a single human mind over the same period of time. The orchestration engine component 102 (e.g., the blueprint component 104 and/or the blueprint transformation component 106) can also be fully operational towards performing one or more other functions (e.g., fully powered on, fully executed, etc.) while also performing the above-referenced orchestration engine process. Moreover, the orchestration engine component 102 (e.g., the blueprint component 104 and/or the blueprint transformation component 106) can include information that is impossible to obtain manually by a user. For example, a type of information included in the executable blueprint and/or the one or more executable resources, an amount of information included in the executable blueprint and/or the one or more executable resources, and/or a variety of information included in the executable blueprint and/or the one or more executable resources can be more complex than information obtained manually by a user.

Figure 2:
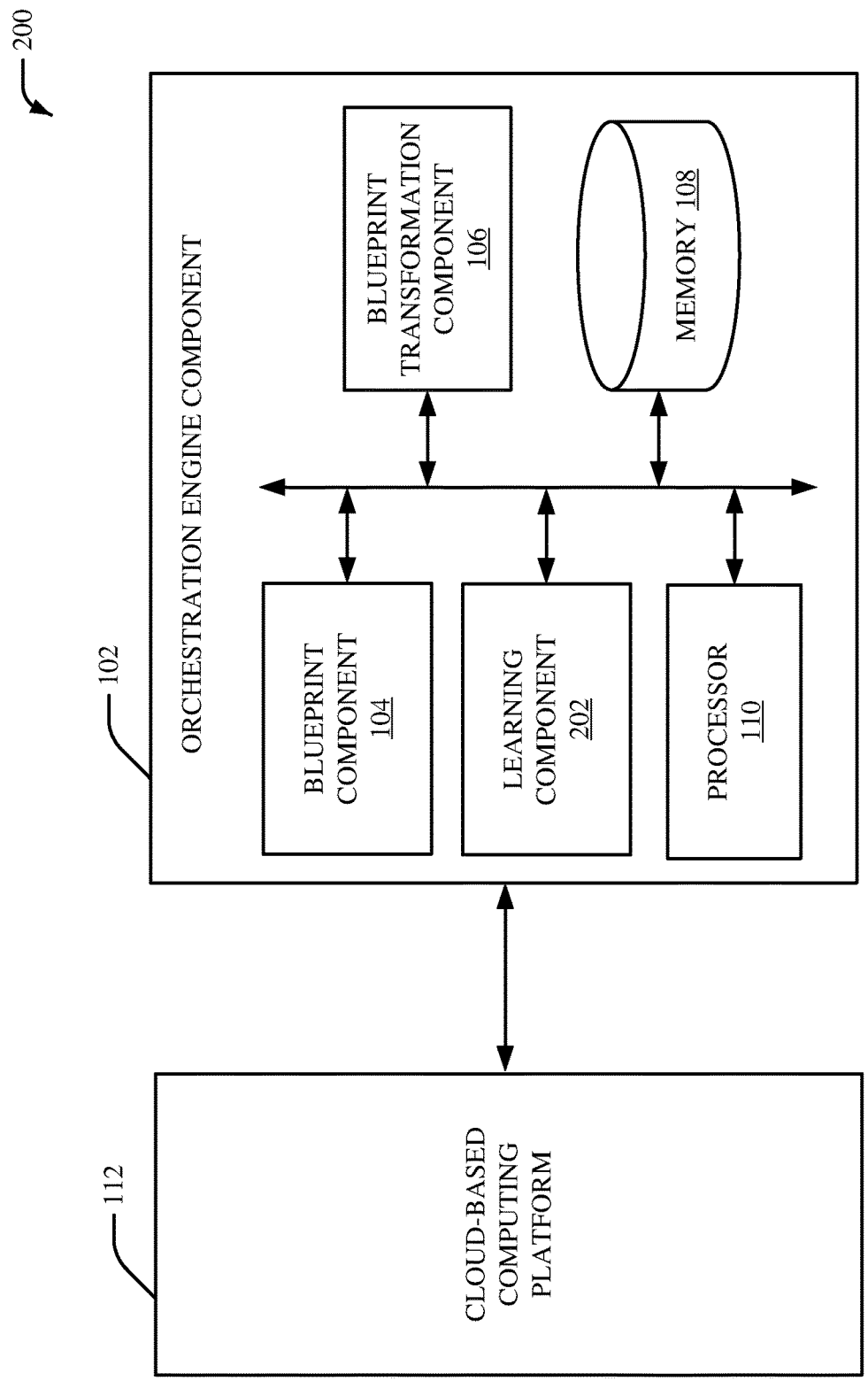
FIG. 2 illustrates a block diagram of another example, non-limiting system that includes an orchestration engine component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the orchestration engine component 102. The orchestration engine component 102 can include the blueprint component 104, the blueprint transformation component 106, a learning component 202, the memory 108 and/or the processor 110. The learning component 202 can monitor the cloud-based computing platform 112 to facilitate learning of one or more abstract resource types and/or information related to one or more abstract resource types associated with the cloud-based computing platform 112. For example, the learning component 202 can monitor the cloud-based computing platform 112 to learn one or more features and/or information related to one or more abstract resource types associated with the cloud-based computing platform 112. In an embodiment, the learning component 202 can employ machine learning and/or principles of artificial intelligence to learn one or more features and/or information related to one or more abstract resource types with the cloud-based computing platform 112. The learning component 202 can perform learning with respect to learning one or more features and/or information related to one or more abstract resource types associated with the cloud-based computing platform 112 explicitly or implicitly. In an aspect, the learning component 202 can learn one or more features and/or information related to one or more abstract resource types associated with the cloud-based computing platform 112 based on classifications, correlations, inferences and/or expressions associated with principles of artificial intelligence. For instance, the learning component 202 can employ an automatic classification system and/or an automatic classification process to learn one or more features and/or information related to one or more abstract resource types associated with the cloud-based computing platform 112. In one example, the learning component 202 can employ a probabilistic and/or statistical-based analysis (e.g., factoring into the analysis utilities and costs) to learn and/or generate inferences with respect to the cloud-based computing platform 112. In an aspect, the learning component 202 can include an inference component (not shown) that can further enhance automated aspects of the learning component 202 utilizing in part inference-based schemes to learn one or more features and/or information related to one or more abstract resource types associated with the cloud-based computing platform 112.

The learning component 202 can employ any suitable machine-learning based techniques, statistical-based techniques and/or probabilistic-based techniques. For example, the learning component 202 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the learning component 202 can perform a set of machine learning computations associated with learning one or more features and/or information related to one or more abstract resource types associated with the cloud-based computing platform 112. For example, the learning component 202 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn one or more features and/or information related to one or more abstract resource types associated with the cloud-based computing platform 112.

Figure 3:
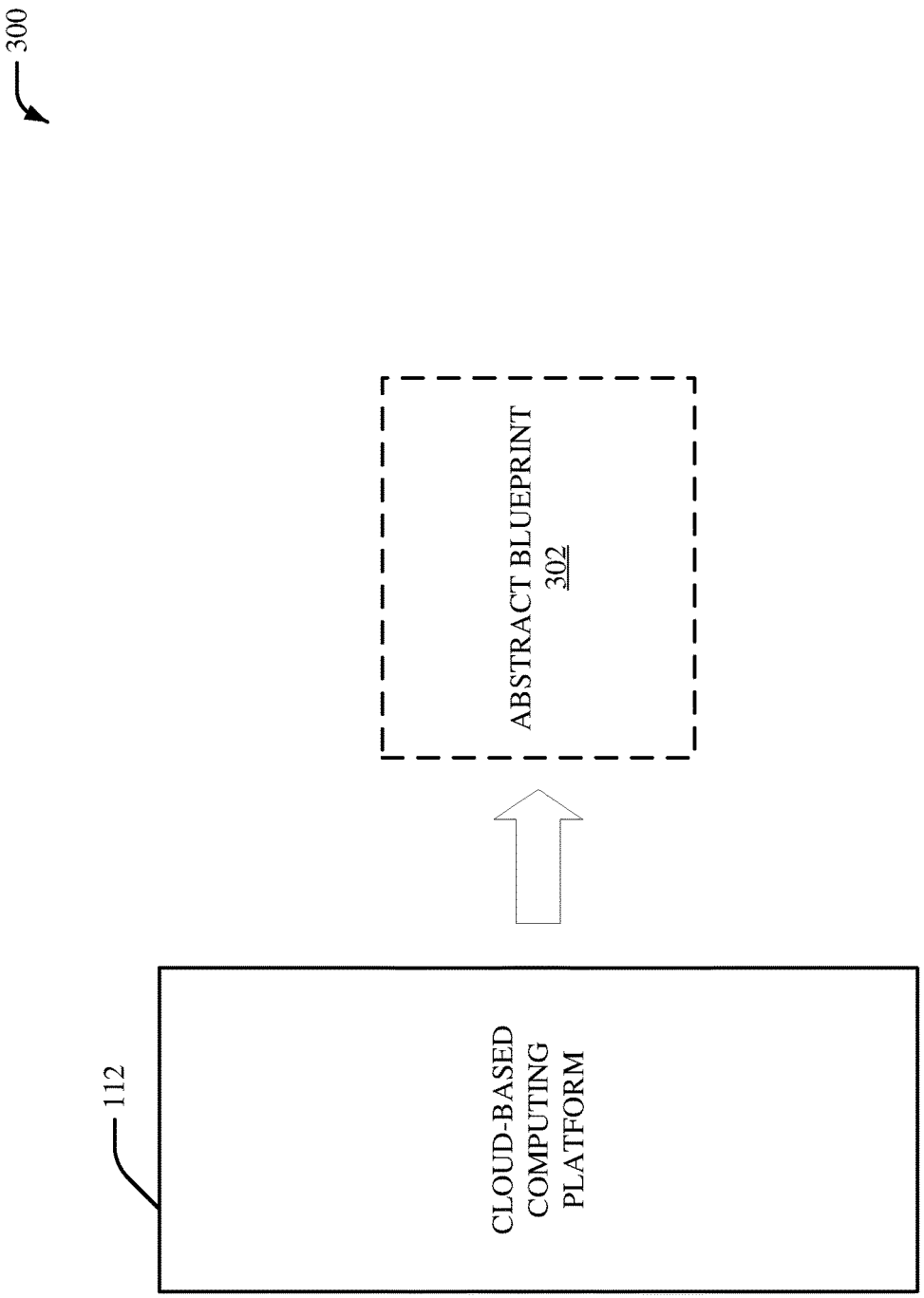
FIG. 3 illustrates an example, non-limiting system that includes a cloud-based computing platform and an abstract blueprint in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the cloud-based computing platform 112. An abstract blueprint 302 can be generated based on the cloud-based computing platform 112. In an embodiment, the abstract blueprint 302 can be provided by the cloud-based computing platform 112. For example, the cloud-based computing platform 112 can generate at least a portion of the abstract blueprint 302. In another embodiment, the abstract blueprint 302 can be generated by analyzing the cloud-based computing platform 112. For example, the orchestration engine component 102 (e.g., the blueprint component 104 of the orchestration engine component 102) can generate at least a portion of the abstract blueprint 302 by analyzing one or more portions of the cloud-based computing platform 112. The abstract blueprint 302 can be a template or a pattern that declares one or more abstract resource types for the cloud-based computing platform 112. For example, the one or more abstract resource types of the abstract blueprint 302 can generically describe one or more types of computing resources and/or properties for one or more computing resources created for the cloud-based computing platform 112. In an aspect, the abstract blueprint 302 can be exported from the cloud-based computing platform 112 as a readable text file. In another aspect, the abstract blueprint 302 can be formatted in a machine-readable format and a human-readable format. For example, the abstract blueprint 302 can be a machine-readable representation and a human-readable representation of the one or more abstract resource types for the cloud-based computing platform 112. In one example, the abstract blueprint 302 can be formatted in a machine-readable format and a human-readable format associated with a data serialization language. In another example, the abstract blueprint 302 can be formatted in a machine-readable format and a human-readable format associated with a data array language. In yet another example, the abstract blueprint 302 can be formatted in a machine-readable format and a human-readable format associated with automated documentation. In another aspect, the abstract blueprint 302 can generically describe one or more attributes of the cloud-based computing platform 112 and/or one or more setting for the cloud-based computing platform 112. Additionally or alternatively, the abstract blueprint 302 can generically describe a set of inter-related cloud resources of the cloud-based computing platform 112.

FIG. 4 illustrates a block diagram of an example, non-limiting system 400 in accordance with one or more embodiments described herein. Repetitive description of like elements employed in other embodiments described herein is omitted for sake of brevity.

The system 400 includes the blueprint component 104. The blueprint component 104 can receive the abstract blueprint 302. Based on the abstract blueprint 302, the blueprint component 104 can determine one or more abstract resource types 402. For example, the blueprint component 104 can extract the one or more abstract resource types 402 from the abstract blueprint 302. Furthermore, the blueprint component 104 can analyze the abstract blueprint to determine the one or more abstract resource types 402. In an embodiment, the one or more abstract resource types 402 can be indicative of information associated with one or more computing resources for the cloud-based computing platform 112. The one or more computing resources for the cloud-based computing platform 112 can include one or more computing resources for hardware associated with the cloud-based computing platform 112 and/or one or more computing resources for software associated with the cloud-based computing platform 112. In a non-limiting example, the one or more computing resources can include one or more computing resources for a processor associated with the cloud-based computing platform 112, one or more computing resources for a virtual machine associated with the cloud-based computing platform 112, one or more computing resources for storage associated with the cloud-based computing platform 112, one or more computing resources for middleware associated with the cloud-based computing platform 112, and/or one or more other computing resources associated with the cloud-based computing platform 112. In an aspect, the one or more abstract resource types 402 can generically describe one or more computing resources for the cloud-based computing platform 112 that comprise similar functions, properties, and/or actions. For instance, the one or more abstract resource types 402 can include virtual machine data associated with the cloud-based computing platform 112, database data associated with the cloud-based computing platform 112, backup as a service data associated with the cloud-based computing platform 112, operating system monitoring data associated with the cloud-based computing platform 112, and/or other data associated with the cloud-based computing platform 112. In an aspect, the one or more abstract resource types 402 can include information associated with a virtual machine of the cloud-based computing platform 112 such as, but not limited to, central processing unit data associated with the virtual machine, memory data associated with the virtual machine, operating system data associated with the virtual machine, network address data (e.g., IP address data) associated with the virtual machine, geography data associated with the virtual machine, security policy data associated with the virtual machine, and/or other data associated with the virtual machine. Additionally or alternatively, the one or more abstract resource types 402 can include information associated with a database of the cloud-based computing platform 112 such as, but not limited to, table name data associated with the database, memory data associated with the database, user data associated with the database (e.g., db_root_username, db_root_password, etc.), port data associated with the database, and/or other data associated with the database. Additionally or alternatively, the one or more abstract resource types 402 can include information associated with a backup service (e.g., a backup as a service process) of the cloud-based computing platform 112 such as, but not limited to, policy data associated with the backup service, schedule data associated with the backup service, permissions data associated with the backup service, security data (e.g., api_key, etc.) associated with the backup service, endpoint network address data (e.g., endpoint IPs, etc.) associated with the backup service, and/or other data associated with the backup service. Additionally or alternatively, the one or more abstract resource types 402 can include information associated with operating system monitoring for the cloud-based computing platform 112 such as, but not limited to, policy data associated with the operating system monitoring, schedule data associated with the operating system monitoring, metrics data associated with the operating system monitoring, security data (e.g., api_key, etc.) associated with the operating system monitoring, endpoint network address data (e.g., endpoint IPs, etc.) associated with the operating system monitoring, and/or other data associated with the operating system monitoring. In one example, the one or more abstract resource types 402 can include a number of processors and/or a type of processor for the cloud-based computing platform 112. Additionally or alternatively, the one or more abstract resource types 402 can include an amount of memory and/or a type of memory for the cloud-based computing platform 112. Additionally or alternatively, the one or more abstract resource types 402 can include a network speed for the cloud-based computing platform 112. However, it is to be appreciated that the one or more abstract resource types 402 can include other type of information to generically describe one or more computing resources associated with the cloud-based computing platform 112. In certain embodiments, the blueprint component 104 can employ an aspect groupings knowledge database to identify the one or more abstract resource types 402 in the abstract blueprint 302. The aspect groupings knowledge database can be, for example, a collection of previously identified abstract resource types and/or information for previously identified abstract resource types.

FIG. 5 illustrates a block diagram of an example, non-limiting system 500 in accordance with one or more embodiments described herein. Repetitive description of like elements employed in other embodiments described herein is omitted for sake of brevity.

The system 500 includes the blueprint transformation component 106. The blueprint transformation component 106 can employ the one or more abstract resource types 402 determined by the blueprint component 104 to generate an executable blueprint 502. The executable blueprint 502 can be, for example, a modified version of the abstract blueprint 302. For instance, the executable blueprint 502 can be executable by the cloud-based computing platform 112. In an aspect, the executable blueprint 502 can include one or more executable resources 504. In another aspect, the executable blueprint 502 can be indicative of a machine-readable representation of the one or more executable resources 504. The one or more executable resources 504 can be, for example, one or more real resources that can be executable by the cloud-based computing platform 112. For instance, the one or more executable resources 504 can be one or more deployable resources for execution by one or more applications associated with the cloud-based computing platform 112. The one or more applications can be provided, for example, by one or more computing environments. For example, the one or more executable resources 504 can include executable data for a virtual machine computing environment, a database computing environment, a backup service computing environment, an operating system monitoring environment, and/or another computing environment. In an embodiment, the blueprint transformation component 106 can generate mapping data to facilitate generation of the executable blueprint. The mapping data can be indicative of a mapping of the one or more abstract resource types to the one or more executable resources. In an aspect, the blueprint transformation component 106 can generate the executable blueprint based on the mapping data. In another aspect, the blueprint transformation component 106 can generate the mapping data based on a set of transformation criteria. For example, the set of transformation criteria can be criteria related to one of service level agreement data, software data, deployment environment data, cost data, security data, location data (e.g., geography data), response time data, dependency data, deadline data, description data, benchmark data, maintainer data, user data, historical data, performance data, risk level data, estimated benefit data and/or other data associated with the cloud-based computing platform 112. The blueprint transformation component 106 can, for example, select an extended resource from an abstract grouping associated with the one or more abstract resource types by employing the set of transformation criteria. Furthermore, the blueprint transformation component 106 can employ the mapping data to bind the one or more abstract resource types to real resources (e.g., the one or more executable resources) during, for example, interpretation and/or execution of the abstract blueprint to generate the executable blueprint.

In another embodiment, the blueprint transformation component 106 can map virtual machine data associated with the abstract blueprint 302 (e.g., virtual machine data associated with the one or more abstract resource types 402), database data associated with the abstract blueprint 302 (e.g., database data associated with the one or more abstract resource types 402), backup as a service data associated with the abstract blueprint 302 (e.g., backup as a service data associated with the one or more abstract resource types 402), operating system monitoring data associated with the abstract blueprint 302 (e.g., operating system monitoring data associated with the one or more abstract resource types 402) and/or other data associated with the abstract blueprint 302 (e.g., other data associated with the one or more abstract resource types 402) into executable resources for the virtual machine computing environment, the database computing environment, the backup service computing environment, the operating system monitoring environment, and/or another computing environment. For instance, the information associated with the virtual machine of the cloud-based computing platform 112 that is included in the one or more abstract resource types 402 can be mapped to a virtual machine computing environment, the information associated with the database of the cloud-based computing platform 112 that is included in the one or more abstract resource types 402 can be mapped to a database computing environment, the information associated with the backup service (e.g., the backup as a service process) of the cloud-based computing platform 112 that is included in the one or more abstract resource types 402 can be mapped to a backup service computing environment, and/or the information associated with the operating system monitoring for the cloud-based computing platform 112 that is included in the one or more abstract resource types 402 can be mapped to an operating system computing environment. The virtual machine computing environment can be a computing environment associated with one or more virtual machines (e.g., one or more virtual servers) associated with the cloud-based computing platform 112. The database computing environment can be a computing environment associated with one or more databases associated with the cloud-based computing platform 112. The backup service computing environment can be a computing environment associated with one or more servers of the cloud-based computing platform 112 that provides one or more backup services. The operating system monitoring environment can be a computing environment associated with one or more servers of the cloud-based computing platform 112 that provides one or more operating system monitoring services.

Figure 6:
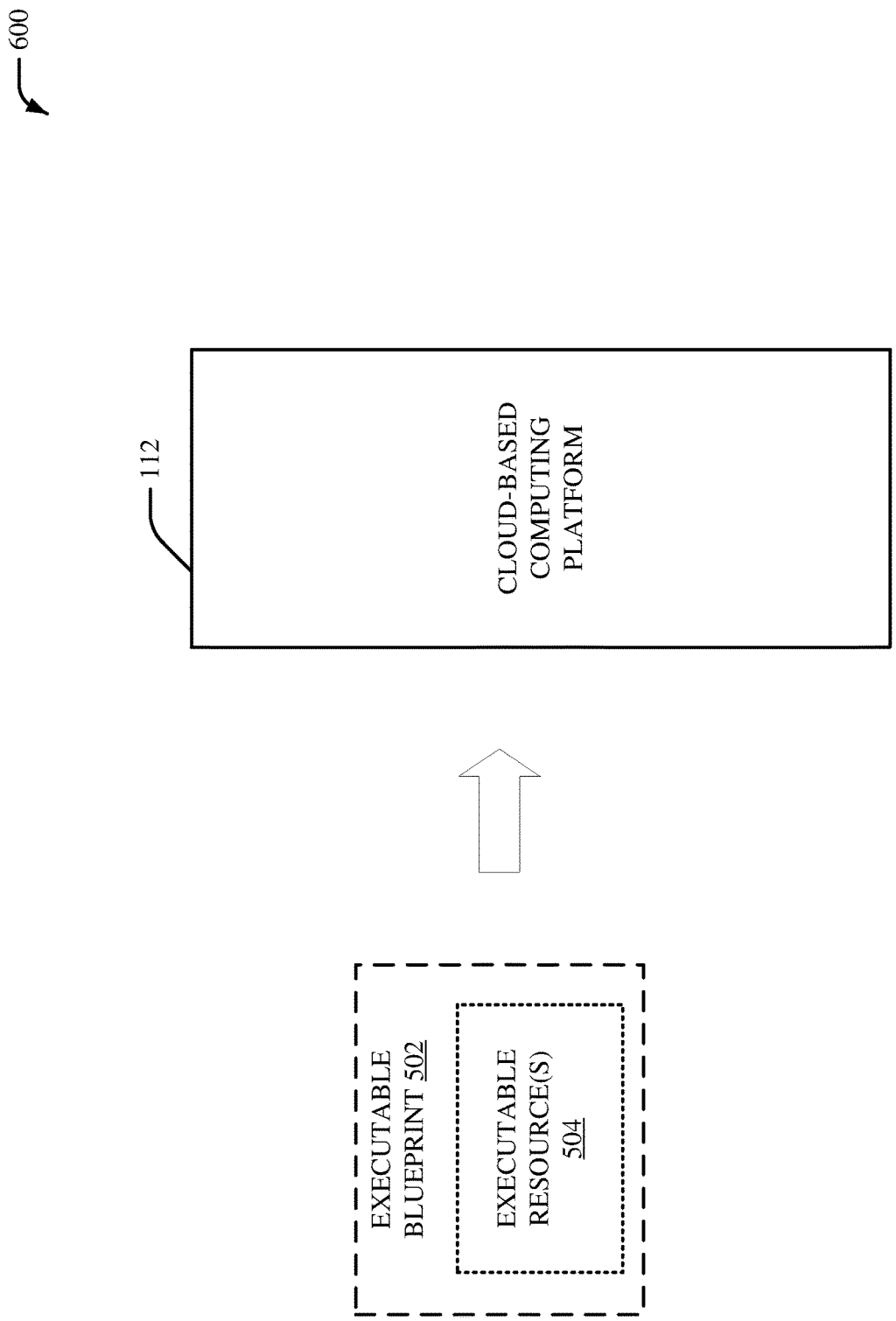
FIG. 6 illustrates an example, non-limiting system that includes a cloud-based computing platform and an executable blueprint in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 includes the cloud-based computing platform 112. In an embodiment, the executable blueprint 502 that includes the one or more executable resources 504 can be employed by the cloud-based computing platform 112. In one embodiment, the executable blueprint 502 can be employed by the cloud-based computing platform 112 to determine an optimal path of execution for hardware and/or software associated with the cloud-based computing platform 112. In certain embodiments, the executable blueprint 502 can be transmitted to the cloud-based computing platform 112 to facilitate employment of the executable blueprint 502 by the cloud-based computing platform 112. The executable blueprint 502 and/or the one or more executable resources 504 can be executed by the cloud-based computing platform 112. In one example, the executable blueprint 502 and/or the one or more executable resources 504 can be executable by an orchestration engine associated with the cloud-based computing platform 112. In an embodiment, the one or more executable resources 504 can be translated into hardware properties and/or software properties for the cloud-based computing platform 112. As such, operating system requirements, memory requirements, processing requirements and/or other requirements for the cloud-based computing platform 112 can be efficiently determined. Moreover, efficiency and/or performance of the cloud-based computing platform 112 can be improved. For example, efficiency and/or performance of hardware and/or software included in the cloud-based computing platform 112 can be improved.

FIG. 7 illustrates a block diagram of an example, non-limiting system 700 in accordance with one or more embodiments described herein. Repetitive description of like elements employed in other embodiments described herein is omitted for sake of brevity.

The system 700 includes abstract virtual machine data 702, abstract database data 704, abstract backup as a service data 706, and abstract operating system monitoring data 708. The abstract virtual machine data 702, the abstract database data 704, the abstract backup as a service data 706, and/or the abstract operating system monitoring data 708 can be, for example, one or more abstract resource types for an abstract blueprint. However, it is to be appreciated that in certain embodiment one or more other types of abstract resource types can additionally or alternatively be included in an abstract blueprint. The abstract virtual machine data 702, the abstract database data 704, the abstract backup as a service data 706, and/or the abstract operating system monitoring data 708 can be determined, for example, by the blueprint component 104. In an embodiment, the abstract virtual machine data 702 can include information associated with a virtual machine of the cloud-based computing platform 112 such as, but not limited to, central processing unit data associated with the virtual machine, memory data associated with the virtual machine, operating system data associated with the virtual machine, network address data (e.g., IP address data) associated with the virtual machine, geography data associated with the virtual machine, security policy data associated with the virtual machine, and/or other data associated with the virtual machine. Additionally or alternatively, the abstract database data 704 can include information associated with a database of the cloud-based computing platform 112 such as, but not limited to, table name data associated with the database, memory data associated with the database, user data associated with the database (e.g., db_root_username, db_root_password, etc.), port data associated with the database, and/or other data associated with the database. Additionally or alternatively, the abstract backup as a service data 706 can include information associated with a backup service (e.g., a backup as a service process) of the cloud-based computing platform 112 such as, but not limited to, policy data associated with the backup service, schedule data associated with the backup service, permissions data associated with the backup service, security data (e.g., api_key, etc.) associated with the backup service, endpoint network address data (e.g., endpoint IPs, etc.) associated with the backup service, and/or other data associated with the backup service. Additionally or alternatively, the abstract operating system monitoring data 708 can include information associated with operating system monitoring for the cloud-based computing platform 112 such as, but not limited to, policy data associated with the operating system monitoring, schedule data associated with the operating system monitoring, metrics data associated with the operating system monitoring, security data (e.g., api_key, etc.) associated with the operating system monitoring, endpoint network address data (e.g., endpoint IPs, etc.) associated with the operating system monitoring, and/or other data associated with the operating system monitoring.

The abstract virtual machine data 702 can be transformed (e.g., by the blueprint transformation component 106) into one or more executable resources for a virtual machine computing environment 710. For instance, the abstract virtual machine data 702 can be transformed (e.g., by the blueprint transformation component 106) into one or more deployable resources for execution by one or more applications and/or one or more processing threads associated with the virtual machine computing environment 710. Additionally or alternatively, the abstract database data 704 can be transformed (e.g., by the blueprint transformation component 106) into one or more executable resources for a database computing environment 712. For instance, the abstract database data 704 can be transformed (e.g., by the blueprint transformation component 106) into one or more deployable resources for execution by one or more applications and/or one or more processing threads associated with the database computing environment 712. Additionally or alternatively, the abstract backup as a service data 706 can be transformed (e.g., by the blueprint transformation component 106) into one or more executable resources for a backup service computing environment 714. For instance, the abstract backup as a service data 706 can be transformed (e.g., by the blueprint transformation component 106) into one or more deployable resources for execution by one or more applications and/or one or more processing threads associated with the backup service computing environment 714. Additionally or alternatively, the abstract operating system monitoring data 708 can be transformed (e.g., by the blueprint transformation component 106) into one or more executable resources and/or one or more processing threads for an operating system monitoring environment 716. For instance, the abstract operating system monitoring data 708 can be transformed (e.g., by the blueprint transformation component 106) into one or more deployable resources for execution by one or more applications associated with the operating system monitoring environment 716.

The virtual machine computing environment can be a computing environment associated with one or more virtual machines (e.g., one or more virtual servers) associated with the cloud-based computing platform 112. The database computing environment can be a computing environment associated with one or more databases associated with the cloud-based computing platform 112. The backup service computing environment can be a computing environment associated with one or more servers of the cloud-based computing platform 112 that provides one or more backup services. The operating system monitoring environment can be a computing environment associated with one or more servers of the cloud-based computing platform 112 that provides one or more operating system monitoring services.

FIG. 8 illustrates a block diagram of an example, non-limiting system 800 in accordance with one or more embodiments described herein. Repetitive description of like elements employed in other embodiments described herein is omitted for sake of brevity.

The system 800 includes an abstract blueprint 802 and an executable blueprint 804. The abstract blueprint 802 can be a blueprint associated with the cloud-based computing platform 112. Furthermore, the abstract blueprint 802 can be a blueprint employed by the orchestration engine component 102 (e.g., the blueprint component 104). For example, the abstract blueprint 802 can correspond to the abstract blueprint 302. The executable blueprint 804 can be a blueprint that is executable by an orchestration engine associated with the cloud-based computing platform 112. Furthermore, the executable blueprint 804 can be a blueprint generated by the orchestration engine component 102 (e.g., the blueprint transformation component 106). For example, the executable blueprint 804 can correspond to the executable blueprint 502. The abstract blueprint 802 can define one or more abstract resource types associated with the cloud-based computing platform 112. The abstract blueprint 802 can also generically define relationships and/or dependencies between one or more resources for the cloud-based computing platform 112. For example, storage associated with the cloud-based computing platform 112 can require an association with a virtual machine of the cloud-based computing platform 112, thereby creating a dependency for the storage. Dependencies between resources for the cloud-based computing platform 112 can facilitate creation of one or more abstract resources types in a correct order. Furthermore, one or more abstract resource types can be uniquely named within the abstract blueprint 802. An abstract resource in the abstract blueprint 802 can include a property value that is explicitly set to a defined value. Additionally or alternatively, an abstract resource in the abstract blueprint 802 can include a property value that is implicitly set via a reference to a property from a different abstract resource in the abstract blueprint 802. Additionally or alternatively, an abstract resource in the abstract blueprint 802 can include a property value that is implicitly set via a reference to an input parameter to the abstract blueprint 802. In an embodiment, the abstract blueprint 802 can be a nested data structure.

In an embodiment, the abstract blueprint 802 can be a template or a pattern that generically declares one or more computing resources for the cloud-based computing platform 112. The abstract blueprint 802 can also generically describe a type of computing resource and/or properties for a computing resource that is created for the cloud-based computing platform 112. In certain embodiments, the abstract blueprint 802 can include one or more abstract resources and/or one or more real resources. For example, the abstract blueprint 802 can include an abstract virtual machine resource 806 that generically describes one or more computing resources for a virtual machine associated with the cloud-based computing platform 112, an abstract database resource 808 that generically describes one or more computing resources for a database associated with the cloud-based computing platform 112, and a real blueprint resource 810 that includes one or more executable resources for monitoring a server associated with the cloud-based computing platform 112. In an aspect, the abstract blueprint 802 can be exported from the cloud-based computing platform 112 as a readable text file. In another aspect, the abstract blueprint 802 can be formatted in a machine-readable format and a human-readable format. For example, the abstract blueprint 802 can be a machine-readable textual representation and a human-readable textual representation of the one or more computing resources for the cloud-based computing platform 112. In one example, the abstract blueprint 802 can be formatted in a machine-readable format and a human-readable format associated with a data serialization language. In another example, the abstract blueprint 802 can be formatted in a machine-readable format and a human-readable format associated with a data array language. In yet another example, the abstract blueprint 802 can be formatted in a machine-readable format and a human-readable format associated with automated documentation.

In another embodiment, one or more portions of the abstract blueprint 802 can be transformed to generate the executable blueprint 804. For example, the abstract virtual machine resource 806 can be transformed into a real virtual machine resource 806'. The real virtual machine resource 806' can include, for example, a transformed portion 812 associated with a real virtual machine resource (e.g., a softlayer virtual machine resource) that satisfies criteria associated with an abstract virtual machine associated with the abstract virtual machine resource 806. Additionally or alternatively, the real virtual machine resource 806' can include, for example, a new portion 814 associated with one or more properties dynamically added based on resource selection. For example, the one or more properties associated with the new portion 814 can satisfy criteria associated with the abstract virtual machine resource 806. Additionally or alternatively, the abstract database resource 808 can be transformed into a real database resource 808'. The real database resource 808' can include, for example, a transformed portion 816 associated with a real database resource (e.g., a DB2 resource) that satisfies criteria associated with an abstract database associated with the abstract database resource 808. The executable blueprint 804 can also include the real blueprint resource 810. In an embodiment, one or more portions of the executable blueprint 804 can include one or more executable resources for hardware associated with the cloud-based computing platform 112, one or more executable resources for software associated with the cloud-based computing platform 112, one or more executable resources for one or more virtual machines associated with the cloud-based computing platform 112, one or more executable resources for storage associated with the cloud-based computing platform 112, one or more executable resources for middleware associated with the cloud-based computing platform 112, and/or one or more executable resources for another resource associated with the cloud-based computing platform 112. In a non-limiting example, the new portion 814 of the executable blueprint 804 can include a region associated with the cloud-based computing platform 112. Additionally or alternatively, the new portion 814 of the executable blueprint 804 can include a number of processors and/or a type of processor for the cloud-based computing platform 112. Additionally or alternatively, the new portion 814 of the executable blueprint 804 can include an amount of memory and/or a type of memory for the cloud-based computing platform 112. Additionally or alternatively, the new portion 814 of the executable blueprint 804 can include a network speed for the cloud-based computing platform 112. However, it is to be appreciated that a new portion of the executable blueprint 804 can include information for one or more other resources associated with the cloud-based computing platform 112.

Figure 9:
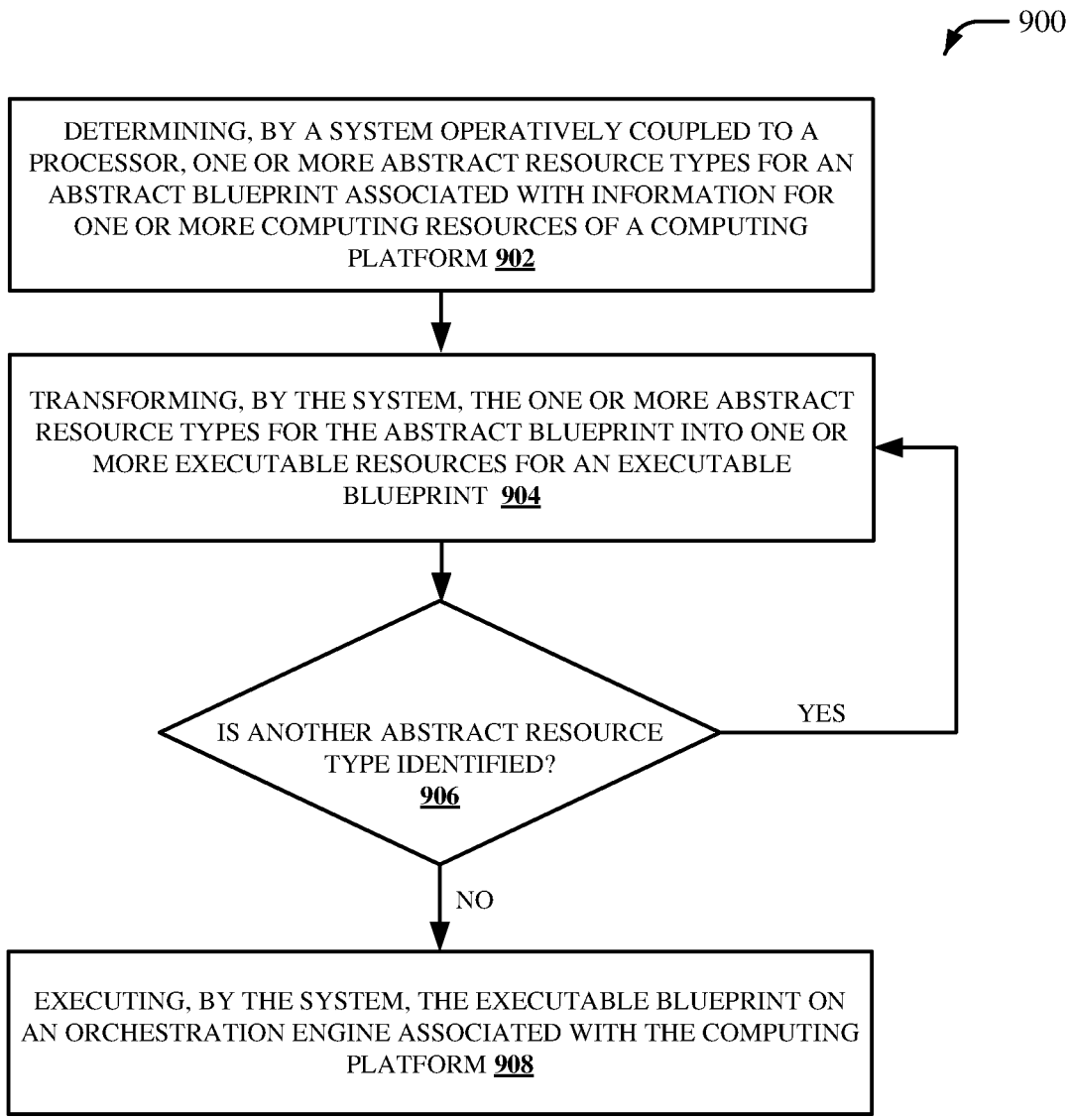
FIG. 9 illustrates a flow diagram of an example, non-limiting computer-implemented method for facilitating orchestration engine resources and/or blueprint definitions for hybrid cloud composition in accordance with one or more embodiments described herein.

FIG. 9 illustrates a flow diagram of an example, non-limiting computer-implemented method 900 that facilitates orchestration engine resources and/or blueprint definitions for hybrid cloud composition in accordance with one or more embodiments described herein. At 902, one or more abstract resource types for an abstract blueprint associated with information for one or more computing resources of a computing platform are determined, by a system operatively coupled to a processor (e.g., by blueprint component 104). In certain embodiments, the computing platform can be a cloud-based computing platform. The abstract blueprint can be a template or a pattern that declares one or more abstract resource types for the computing platform. For example, the one or more abstract resource types of the abstract blueprint can generically describe one or more types of computing resources and/or properties for one or more computing resources created for the computing platform. In an aspect, the abstract blueprint can be exported from the computing platform as a readable text file. In another aspect, the abstract blueprint can be formatted in a machine-readable format and a human-readable format. For example, the abstract blueprint can be a machine-readable representation and a human-readable representation of the one or more abstract resource types for the computing platform. In one example, the abstract blueprint can be formatted in a machine-readable format and a human-readable format associated with a data serialization language. In another example, the abstract blueprint can be formatted in a machine-readable format and a human-readable format associated with a data array language. In yet another example, the abstract blueprint can be formatted in a machine-readable format and a human-readable format associated with automated documentation. In another aspect, the abstract blueprint can generically describe one or more attributes of the computing platform and/or one or more setting for the computing platform. Additionally or alternatively, the abstract blueprint can generically describe a set of inter-related cloud resources of the computing platform.

In an embodiment, the one or more abstract resource types can be determined based on the abstract blueprint. For example, the one or more abstract resource types can be extracted from the abstract blueprint. Furthermore, the abstract blueprint can be analyzed to determine the one or more abstract resource types. In an embodiment, the one or more abstract resource types can be indicative of information associated with one or more computing resources for the computing platform. The one or more computing resources for the computing platform can include one or more computing resources for hardware associated with the computing platform and/or one or more computing resources for software associated with the computing platform. In a non-limiting example, the one or more computing resources can include one or more computing resources for a processor associated with the computing platform, one or more computing resources for a virtual machine associated with the computing platform, one or more computing resources for storage associated with the computing platform, one or more computing resources for middleware associated with the computing platform, and/or one or more other computing resources associated with the computing platform. In an aspect, the one or more abstract resource types can generically describe one or more computing resources for the computing platform that comprise similar functions, properties, and/or actions. For instance, the one or more abstract resource types can include virtual machine data associated with the computing platform, database data associated with the computing platform, backup as a service data associated with the computing platform, operating system monitoring data associated with the computing platform, and/or other data associated with the computing platform. In an aspect, the one or more abstract resource types can include information associated with a virtual machine of the computing platform such as, but not limited to, central processing unit data associated with the virtual machine, memory data associated with the virtual machine, operating system data associated with the virtual machine, network address data (e.g., IP address data) associated with the virtual machine, geography data associated with the virtual machine, security policy data associated with the virtual machine, and/or other data associated with the virtual machine. Additionally or alternatively, the one or more abstract resource types can include information associated with a database of the computing platform such as, but not limited to, table name data associated with the database, memory data associated with the database, user data associated with the database (e.g., db_root_username, db_root_password, etc.), port data associated with the database, and/or other data associated with the database. Additionally or alternatively, the one or more abstract resource types can include information associated with a backup service (e.g., a backup as a service process) of the computing platform such as, but not limited to, policy data associated with the backup service, schedule data associated with the backup service, permissions data associated with the backup service, security data (e.g., api_key, etc.) associated with the backup service, endpoint network address data (e.g., endpoint IPs, etc.) associated with the backup service, and/or other data associated with the backup service. Additionally or alternatively, the one or more abstract resource types can include information associated with operating system monitoring for the computing platform such as, but not limited to, policy data associated with the operating system monitoring, schedule data associated with the operating system monitoring, metrics data associated with the operating system monitoring, security data (e.g., api_key, etc.) associated with the operating system monitoring, endpoint network address data (e.g., endpoint IPs, etc.) associated with the operating system monitoring, and/or other data associated with the operating system monitoring. In one example, the one or more abstract resource types can include a number of processors and/or a type of processor for the computing platform. Additionally or alternatively, the one or more abstract resource types can include an amount of memory and/or a type of memory for the computing platform. Additionally or alternatively, the one or more abstract resource types can include a network speed for the computing platform.

At 904, the one or more abstract resource types for the abstract blueprint are transformed, by the system (e.g., by blueprint transformation component 106) into one or more executable resources for an executable blueprint. The executable blueprint can be indicative of a machine-readable representation of the one or more executable resources. The one or more executable resources can be, for example, one or more real resources that can be executable by the computing platform. For instance, the one or more executable resources can be one or more deployable resources for execution by one or more applications associated with the computing platform. The one or more applications can be provided, for example, by one or more computing environments. For example, the one or more executable resources can include executable data for a virtual machine computing environment, a database computing environment, a backup service computing environment, an operating system monitoring environment, and/or another computing environment. In an embodiment, mapping data can be employed to facilitate generation of the executable blueprint. The mapping data can be indicative of a mapping of the one or more abstract resource types to the one or more executable resources. In an aspect, the executable blueprint can be generated based on the mapping data. In another aspect, the mapping data can be generated based on a set of transformation criteria. For example, the set of transformation criteria can be criteria related to one of service level agreement data, software data, deployment environment data, cost data, security data, location data (e.g., geography data), response time data, dependency data, deadline data, description data, benchmark data, maintainer data, user data, historical data, performance data, risk level data, estimated benefit data and/or other data associated with the computing platform. An extended resource can be selected, for example, from an abstract grouping associated with the one or more abstract resource types by employing the set of transformation criteria. Furthermore, the mapping data can be employed to bind the one or more abstract resource types to real resources (e.g., the one or more executable resources) during, for example, interpretation and/or execution of the abstract blueprint to generate the executable blueprint.

In another embodiment, virtual machine data associated with the abstract blueprint (e.g., virtual machine data associated with the one or more abstract resource types), database data associated with the abstract blueprint (e.g., database data associated with the one or more abstract resource types), backup as a service data associated with the abstract blueprint (e.g., backup as a service data associated with the one or more abstract resource types), operating system monitoring data associated with the abstract blueprint (e.g., operating system monitoring data associated with the one or more abstract resource types) and/or other data associated with the abstract blueprint (e.g., other data associated with the one or more abstract resource types) can be mapped into one or more executable resources for the virtual machine computing environment, the database computing environment, the backup service computing environment, the operating system monitoring environment, and/or another computing environment. For instance, the information associated with the virtual machine of the computing platform that is included in the one or more abstract resource types can be mapped to a virtual machine computing environment, the information associated with the database of the computing platform that is included in the one or more abstract resource types can be mapped to a database computing environment, the information associated with the backup service (e.g., the backup as a service process) of the computing platform that is included in the one or more abstract resource types can be mapped to a backup service computing environment, and/or the information associated with the operating system monitoring for the computing platform that is included in the one or more abstract resource types can be mapped to an operating system computing environment. The virtual machine computing environment can be a computing environment associated with one or more virtual machines (e.g., one or more virtual servers) associated with the computing platform. The database computing environment can be a computing environment associated with one or more databases associated with the computing platform. The backup service computing environment can be a computing environment associated with one or more servers of the computing platform that provides one or more backup services. The operating system monitoring environment can be a computing environment associated with one or more servers of the computing platform that provides one or more operating system monitoring services.

At 906, it is determined whether another abstract resource type is identified. If yes, the computer-implemented method 900 returns to 904 to update the abstract blueprint. If no, the computer-implemented method 900 proceeds to 908.

At 908, the executable blueprint is executed, by the system (e.g., by blueprint transformation component 106) on an orchestration engine associated with the computing platform. In one embodiment, the executable blueprint can be employed by the orchestration engine associated with the computing platform to determine an optimal path of execution for hardware and/or software associated with the computing platform. In certain embodiments, the executable blueprint can be transmitted to the computing platform to facilitate employment of the executable blueprint by the orchestration engine associated with the computing platform. The executable blueprint and/or the one or more executable resources can be executed by the orchestration engine associated with the computing platform. In an embodiment, the one or more executable resources can be translated into hardware properties and/or software properties for the computing platform. In certain embodiments, the computer-implemented method 900 can additionally or alternatively include generating, by the system, mapping data indicative of a mapping of the one or more abstract resource types to the one or more executable resources. In certain embodiments, the computer-implemented method 900 can additionally or alternatively include generating, by the system, the executable blueprint based on the mapping data. In certain embodiments, the computer-implemented method 900 can additionally or alternatively include generating, by the system, the mapping data based on a set of transformation criteria. In certain embodiments, the computer-implemented method 900 can additionally or alternatively include generating, by the system, the mapping data based on at least one of service level agreement data, software data, deployment environment data, cost data, security data, response time data, dependency data, deadline data, user data, historical data, performance data, risk level data, and estimated benefit data. In certain embodiments, the executable blueprint can be executed on the orchestration engine associated with the computing platform to improve performance of the computing platform.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least transforming one or more abstract resource types and/or executing an executable blueprint is established from a combination of electrical and mechanical components and circuitry, a human is unable to replicate or perform processing performed by the orchestration engine component 102 (e.g., the blueprint component 104, the blueprint transformation component 106, and/or the learning component 202) disclosed herein. For example, a human is unable to transform one or more abstract resource types into one or more executable resources, a human is unable to execute an executable blueprint on a cloud-based computing platform, etc.

Figure 10:
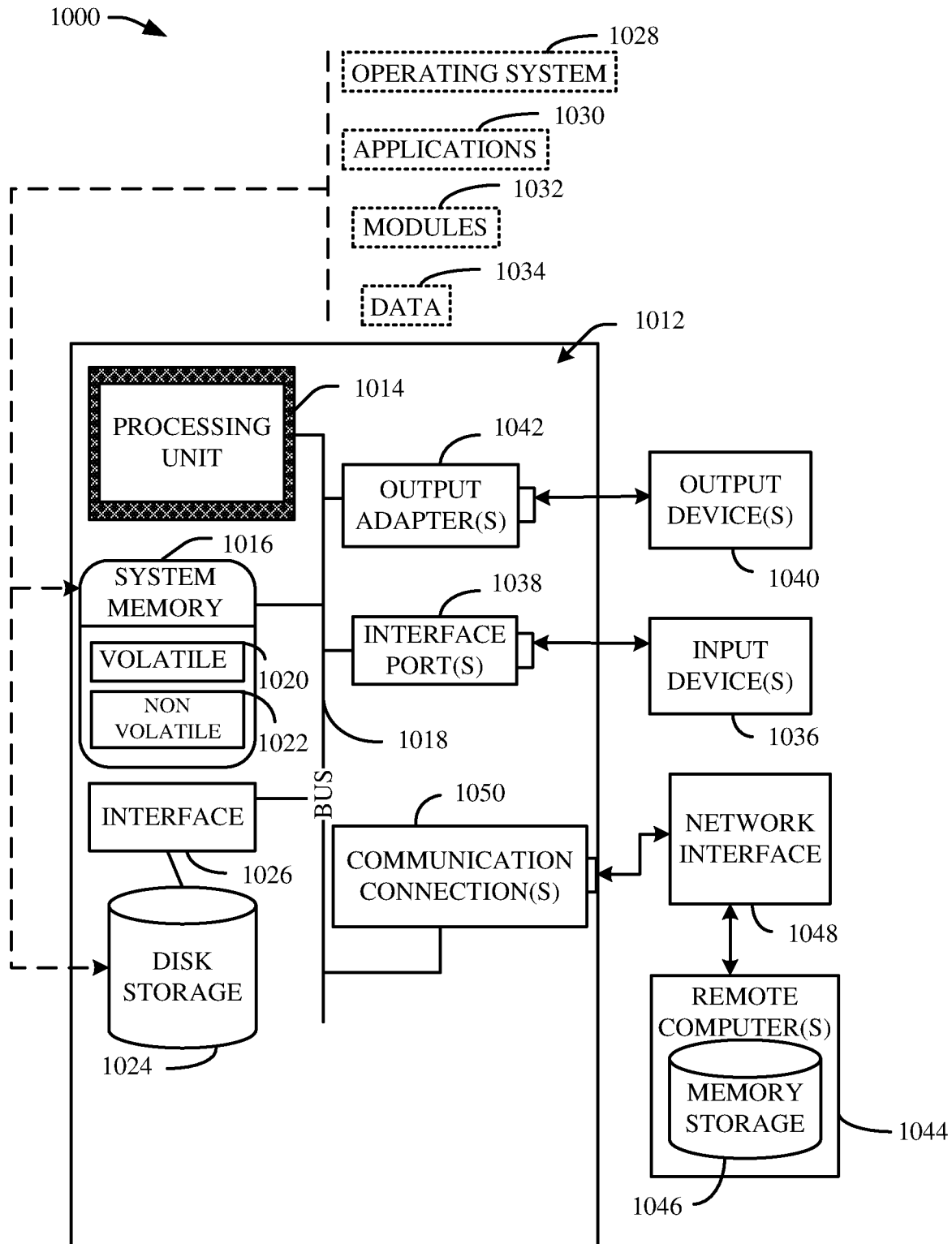
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
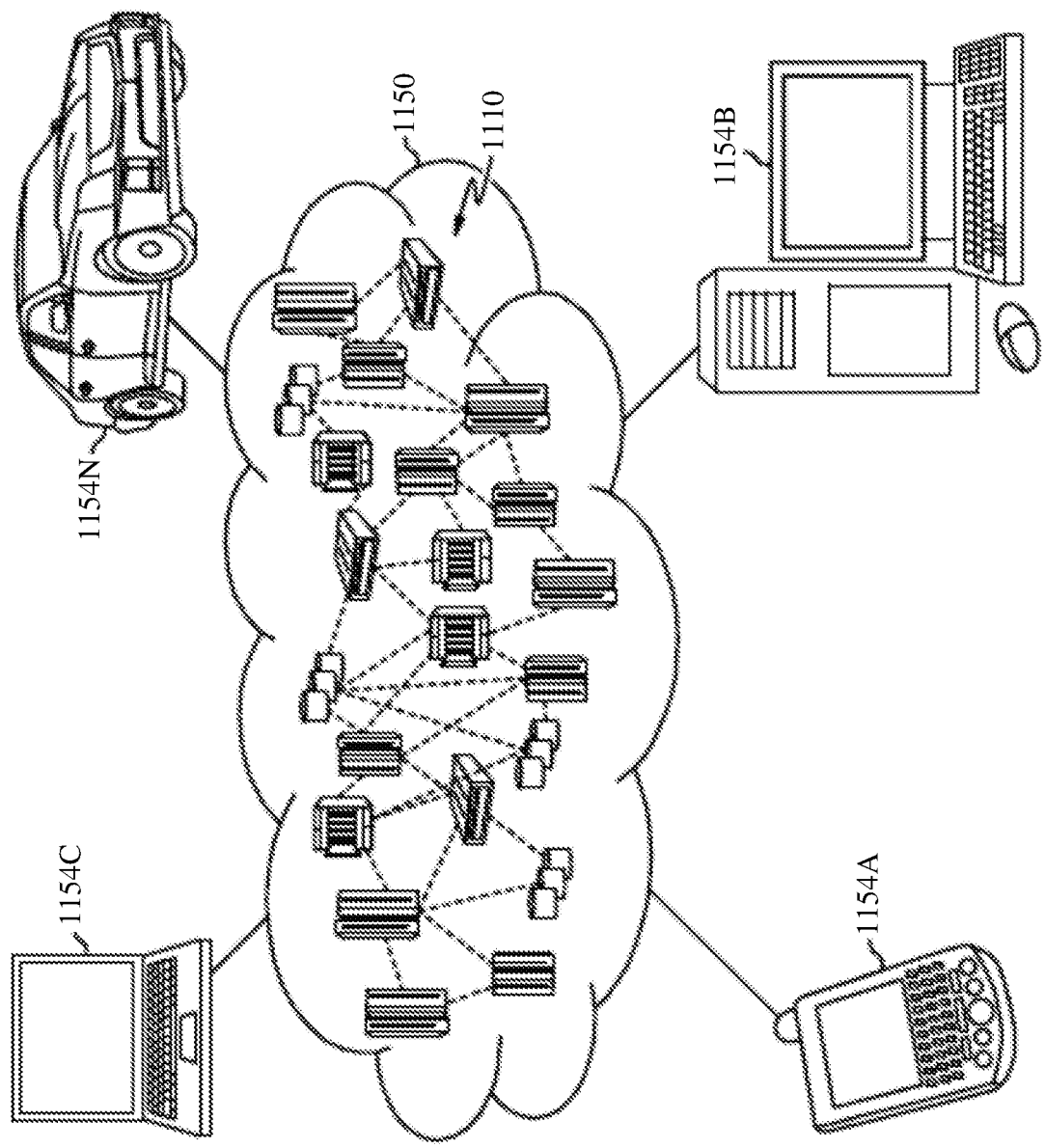
FIG. 11 illustrates a block diagram of an example, non-limiting cloud computing environment in accordance with one or more embodiments of the present invention.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
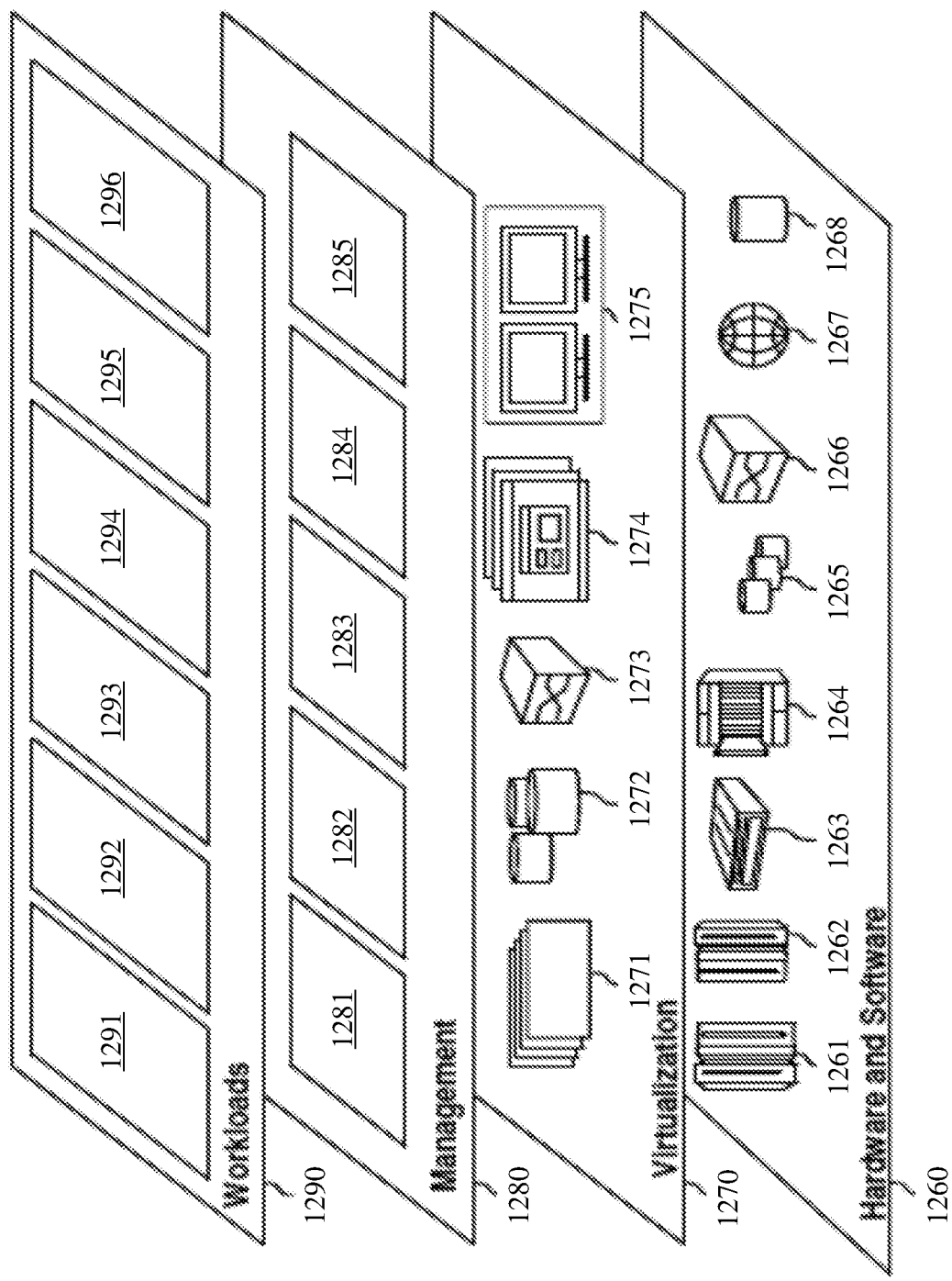
FIG. 12 illustrates a block diagram of example, non-limiting abstraction model layers in accordance with one or more embodiments of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and orchestration engine process software 1296.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes computer executable components stored in the memory, wherein the computer executable components comprise:
a blueprint component that determines, using machine learning that monitors a computing platform to learn one or more features related to one or more abstract resource types, a plurality of abstract resource types for an abstract blueprint associated with the computing platform, wherein the plurality of abstract resource types are indicative of information associated with a plurality of computing resources for the computing platform, and the plurality of abstract resource types comprises at least two of virtual machine data, database data, backup as a service data, or operating system monitoring data; and
a blueprint transformation component that transforms, based on transformation criteria, the plurality of abstract resource types for the abstract blueprint into one or more executable resources for an executable blueprint that is executable by an orchestration engine, wherein the one or more executable resources are translated into hardware and software requirements for the computing platform, and wherein the transformation criteria comprises a risk level criterion and an estimated benefit criterion.

2. The system of claim 1, wherein the executable blueprint is indicative of a machine-readable representation of the one or more executable resources.

3. The system of claim 1, wherein the blueprint transformation component generates mapping data indicative of a mapping of the plurality of abstract resource types to the one or more executable resources, and wherein the blueprint transformation component generates the executable blueprint based on the mapping data.

4. The system of claim 3, wherein the transformation criteria further comprises at least one of a compliance criteria, a cost criteria, or a geography criteria.

5. The system of claim 3, wherein the blueprint transformation component generates the mapping data based on at least one of service level agreement data, software data, deployment environment data, cost data, security data, response time data, dependency data, deadline data, user data, historical data, performance data, risk level data, and estimated benefit data.

6. The system of claim 1, wherein the one or more executable resources comprises executable data for at least one of a virtual machine computing environment, a database computing environment, a backup service computing environment, and an operating system monitoring environment.

7. The system of claim 1, wherein the blueprint component generates the plurality of abstract resource types for a hybrid cloud-based computing platform, a public cloud-based computing platform, or a private cloud-based computing platform.

8. The system of claim 1, wherein the blueprint transformation component transforms the plurality of abstract resource types for the abstract blueprint into one or more executable resources for the executable blueprint to facilitate improved performance for the computing platform.

9. A computer-implemented method, comprising:
determining, by a system operatively coupled to a processor, using machine learning that monitors a computing platform to learn one or more features related to one or more abstract resource types, a plurality of abstract resource types for an abstract blueprint associated with information for one or more computing resources of the computing platform, and the plurality of abstract resource types comprises at least two of virtual machine data, database data, backup as a service data, or operating system monitoring data;

transforming, by the system, based on transformation criteria, the plurality of abstract resource types for the abstract blueprint into one or more executable resources for an executable blueprint, wherein the transformation criteria comprises a risk level criterion and an estimated benefit criterion; and executing, by the system, the executable blueprint on an orchestration engine associated with the computing platform to specify hardware and software requirements for the computing platform.

10. The computer-implemented method of claim 9, further comprising:

generating, by the system, mapping data indicative of a mapping of the plurality of abstract resource types to the one or more executable resources.

11. The computer-implemented method of claim 10, further comprising:

generating, by the system, the executable blueprint based on the mapping data.

12. The computer-implemented method of claim 10, wherein the transformation criteria further comprises at least one of a compliance criteria, a cost criteria, or a geography criteria.

13. The computer-implemented method of claim 10, further comprising:

generating, by the system, the mapping data based on at least one of service level agreement data, software data, deployment environment data, cost data, security data, response time data, dependency data, deadline data, user data, historical data, performance data, risk level data, and estimated benefit data.

14. The computer-implemented method of claim 10, wherein the executing the executable blueprint comprises improving performance of the computing platform.

15. The computer-implemented method of claim 9, wherein the executable blueprint is indicative of a machine-readable representation of the one or more executable resources.

16. A computer program product facilitating an orchestration engine process, the computer program product comprising a computer readable storage medium having program instructions embodied therewith, the program instructions executable by a processor to cause the processor to:

determine, by the processor, using machine learning that monitors a computing platform to learn one or more features related to one or more abstract resource types, a plurality of abstract resource types for an abstract blueprint associated with information for one or more computing resources of the computing platform, and the plurality of abstract resource types comprises at least two of virtual machine data, database data, backup as a service data, or operating system monitoring data;

transform, by the processor, based on transformation criteria, the plurality of abstract resource types for the abstract blueprint into one or more executable resources for an executable blueprint, wherein the transformation criteria comprises a risk level criterion and an estimated benefit criterion; and execute, by the processor, the executable blueprint on the computing platform to specify hardware and software requirements for the computing platform.

17. The computer program product of claim 16, wherein the program instructions are further executable by the processor to cause the processor to:

generate, by the processor, mapping data indicative of a mapping of the plurality of abstract resource types to the one or more executable resources.

18. The computer program product of claim 17, wherein the program instructions are further executable by the processor to cause the processor to:

generate, by the processor, the executable blueprint based on the mapping data.

19. The computer program product of claim 17, wherein the transformation criteria further comprises at least one of a compliance criteria, a cost criteria, or a geography criteria.

20. The computer program product of claim 17, wherein the program instructions are further executable by the processor to cause the processor to:

generate, by the processor, the mapping data based on at least one of service level agreement data, software data, deployment environment data, cost data, security data, response time data, dependency data, deadline data, user data, historical data, performance data, risk level data, and estimated benefit data.

* * * * *